United States Patent [19]

Tsuboniwa et al.

[11] Patent Number: 4,816,537

[45] Date of Patent: * Mar. 28, 1989

[54] BLOCKED ISOCYANATOCARBONYL GROUP-CONTAINING POLYMERS, AND THEIR PRODUCTION AND USE

[75] Inventors: Noriyuki Tsuboniwa, Osaka; Satoshi Urano; Ryuzo Mizuguchi, both of Kyoto, all of

[73] Assignee: Nippon Paint Co., LTD., Japan

[*] Notice: The portion of the term of this patent subsequent to May 12, 2004 has been disclaimed.

[21] Appl. No.: 42,107

[22] Filed: Apr. 22, 1987

[30] Foreign Application Priority Data

Apr. 22, 1986 [JP] Japan .................................. 61-94295
Apr. 22, 1986 [JP] Japan .................................. 61-94296

[51] Int. Cl.$^4$ ...................... C08F 20/54; C08F 20/34; C08F 26/06
[52] U.S. Cl. ...................................... 526/301; 526/265; 526/258; 526/302; 526/311
[58] Field of Search ............... 526/301, 302, 312, 311, 526/265, 258

[56] References Cited

U.S. PATENT DOCUMENTS

| | | | |
|---|---|---|---|
| 3,551,390 | 12/1970 | Krimm et al. | 526/312 |
| 3,567,695 | 3/1971 | Brotherton et al. | 526/312 |
| 4,320,221 | 3/1982 | Hoffman | 526/302 |
| 4,374,969 | 2/1983 | Frisch, Jr. | 526/302 |
| 4,451,627 | 5/1984 | Frisch, Jr. et al. | 526/302 |
| 4,659,795 | 4/1987 | Tsutsui et al. | 526/312 |
| 4,666,993 | 5/1987 | Urano et al. | 526/312 |

Primary Examiner—Harold D. Anderson
Assistant Examiner—Dennis R. Daley
Attorney, Agent, or Firm—Wegner & Bretschneider

[57] ABSTRACT

A blocked isocyanatocarbonyl group-containing polymer which comprises a carbon-carbon backbone chain and at least one blocked isocyanatocarbonyl group and at least one active hydrogen-containing group or an acidic or basic group and has a molecular weight of 1,000 to 100,000, the contents of said blocked isocyanatocarbonyl group and said active hydrogen-containing group or said acidic or basic group being respectively from 1 to 99% by weight and from 0.1 to 90% by weight or from 1 to 90% by weight on the weight of the polymer, which is useful as a resin component in a coating agent, an adhesive agent or the like.

10 Claims, No Drawings

BLOCKED ISOCYANATOCARBONYL GROUP-CONTAINING POLYMERS, AND THEIR PRODUCTION AND USE

The present invention relates to blocked isocyanatocarbonyl group-containing polymers, and their production and use.

Compounds having an isocyanato group are extensively used in the field of polymer chemistry due to the excellent reactivity of the isocyanato group therein. Especially, compounds having both a polymerizable unsaturated group and an isocyanato group in their molecules have a high possibility of being usable in various industrial fields, because those two functional groups can respectively participate in various reactions with different reaction mechanisms. One of the compounds as provided from this viewpoint is an acyl isocyanate compound of the formula:

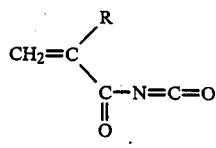

wherein R is a hydrogen atom or a lower alkyl group (e.g. methyl, ethyl) (Japanese Patent Publication (unexamined) No. 115557/1985).

As the result of an extensive study on the use of the acyl isocyanate compound (I), it has now been found that a polymer comprising units of a blocked acyl isocyanate compound derived from the acyl isocyanate compound (I) is useful as a resin component in a coating agent, an adhesive agent or the like. This invention is based on the above finding.

According to the present invention, there is provided a blocked isocyanatocarbonyl group-containing polymer comprising a carbon-carbon backbone chain and at least one blocked isocyanatocarbonyl group and at least one active hydrogen-containing group and having a molecular weight of about 1,000 to 100,000, the contents of said blocked isocyanatocarbonyl group and said active hydrogen-containing group being respectively from about 1 to 99% by weight and from about 0.1 to 90% by weight on the weight of the polymer.

The blocked isocyanatocarbonyl group is representable by the formula:

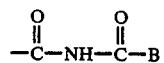

wherein B is a residue of a blocking agent excluding therefrom the hydrogen atom participated in the reaction with an isocyanato group.

The blocked isocyanatocarbonyl group-containing polymer is obtainable by polymerization of a blocked acyl isocyanate compound of the formula:

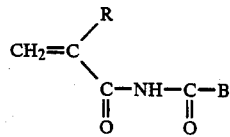

wherein R is a hydrogen atom or a lower alkyl group (e.g. methyl, ethyl) and B is as defined above with an ethylenically unsaturated compound having at least one active hydrogen-containing group and optionally at least one other polymerizable compound.

The blocked acyl isocyanate compound (II) can be produced by blocking the acyl isocyanate compound (I) with a blocking agent of the formula:

$$B-H \qquad (III)$$

wherein B is as defined above.

As stated above, the acyl isocyanate compound (I) is per se known and may be produced, for instance, by reacting acrylamide or alpha-alkylacrylamide with an oxalyl halide (e.g. oxalyl chloride) in an inert solvent such as a halogenated hydrocarbon at a temperature of about 0 to 80° C.

The blocking of the acyl isocyanate compound (I) with the blocking agent (III) may be effected at a temperature not higher than about 100° C., preferably from about −20 to 100° C., more preferably from about 0° to 30° C. Since the acyl isocyanate compound (I) has an ethylenic unsaturation and an isocyanato group which are quite active, various side-reactions may be expected to proceed in addition to the desired blocking. Actually, however, the selective and predominant proceeding of blocking can be assured insofar as the temperature is kept below about 100° C.

The blocking agent (III) to be used may be anyone as conventionally employed for blocking of an isocyanato group. The blocking agent (III) is required to contain at least one active hydrogen atom and, in addition, can optionally contain any substituent which may be neutral, acidic or basic. It may be chosen, for instance, from hydroxyl compounds such as alcoholic or phenolic compounds, particularly aliphatic, alicyclic or aromatic alcohols or phenols. Specific examples are aliphatic alcohols having not more than 10 carbon atoms (e.g. methanol, ethanol, chloroethanol, propanol, butanol, pentanol, hexanol, heptanol, octanol, nonanol, 3,3,5-trimethylhexanol, 2-ethylhexanol, decanol), aromatic alkanols (e.g. phenylcarbinol, methylphenylcarbinol), ether-bond containing alcohols (e.g. ethylene glycol monoethyl ether, ethylene glycol monobutyl ether), phenolic compounds (e.g. phenol, cresol, xylenol, nitrophenol, chlorophenol, ethylphenol, t-butylphenol, nonylphenol), monofunctional polyethylene or polypropylene oxides (e.g. Carbowax 550), etc. There may be also used other blocking agents, of which examples are methylene compounds (e.g. acetylacetone, diethyl malonate), lactams (e.g. propiolactam, butyrolactam, valerolactam, caprolactam), N-hydroxyimides (e.g. N-hydroxyphthalimide, N-hydroxyglutarimide, N-hydroxysuccinimide), oximes (e.g. methylethylketoxime, acetoxime, cyclohexanoxime), imidazoles (e.g. 1,3-imidazole), triazoles (e.g. 1,2,3-benzotriazole), amines (e.g. dicyclohexylamine), etc.

The blocking agent (III) is often in a liquid state at a temperature for blocking, and in such case, it can be served as a reaction medium simultaneously. Regardless of whether the blocking agent (III) is in a liquid state or not, an inert solvent may be used as a reaction medium on the blocking. Examples of the inert solvent are aliphatic hydrocarbons (e.g. pentane, hexane, heptane), aromatic hydrocarbons (e.g. benzene, toluene, xylene), alicyclic hydrocarbons (e.g. cyclohexane, methylcyclohexane, decalin), petrolic hydrocarbons (e.g. petroleum ether, petroleum benzin), halogenated hydrocarbons (e.g. carbon tetrachloride, chloroform, 1,2-dichloroethane), ethers (e.g. ethyl ether, isopropyl ether, anisole, dioxane, tetrahydrofuran), ketones (e.g. acetone, methylethylketone, methylisobutylketone, cyclohexanone, acetophenone, isophorone), esters (e.g. ethyl acetate, butyl acetate), acetonitrile, dimethylformamide, dimethylformsulfoxide), etc. These solvents may be used alone or in combination. If necessary, a tin catalyst may be used on the blocking, but in an ordinary case, there is no need to use such catalyst.

The thus obtained blocked acyl isocyanate compound (II) is blocked at the active site so that it can be subjected to polymerization with an ethylenically unsaturated compound having at least one active hydrogen atom-containing group, particularly an acidic or basic group such as a carboxylic acid group, a sulfonic acid group, a phosphoric acid group or an amino group, and optionally at least one other polymerizale compound to give a polymer having an active hydrogen-containing group imparting any favorable physical and/or chemical property thereto.

As the ethylenically unsaturated compound having at least one active hydrogen-containing group, there are exemplified unsaturated acids (e.g. acrylic acid, methacrylic acid, crotonic acid, cinnamic acid, 2-isopropylacrylic acid, cis- or trans-2-decenoic acid, alpha-chloroacrylic acid, beta-trans-nitroacrylic acid), unsaturated alcohols (e.g. croton alcohol, cinnamyl alcohol, o-hydroxystyrene, ethylene glycol monoacrylate, ethylene glycol monomethacrylate, propylene glycol monoacrylate, propylene glycol monomethacrylate), unsaturated amides (e.g. acrylamide, methacrylamide, crotonamide, cinnamylamide, p-benzadmidostyrene), unsaturated sulfonic acids (e.g. 2-sulfoethyl acrylate, 2-sulfoethyl methacrylate, t-butyl acrylamidosulfonic acid, 4-sulfophenyl acrylate, p-vinylbenzenesulfonic acid), unsaturated phosphoric acids (e.g. acid phosphoxyethyl methacrylate, 3-chloro-2-amidophosphoxypropyl methacrylate, acid phosphoxypropyl methacrylate, vinyl phosphate, isopropenyl phosphate), unsaturated amines (e.g. allylamine, o-aminostyrene, m-aminostyrene, t-butylaminoethyl methacrylate, 7-amino-3,7-dimethyloctyl acrylate), etc. These may be used either solely or in combination.

The other polymerizable compound as optionally used is the one having no active hydrogen atom, of which examples are monoolefinic or diolefinic hydrocarbons (e.g. styrene, alpha-methylstyrene, alpha-ethylstyrene, isobutylene, 2-methylbutene-1, 2-methylpentene-1, 2,3-dimethylbutene-1, 2,3-dimethylpentene-1, 2,4-dimethylpentene-1, 2,3,3-trimethylpentene-1, 2,3-dimethylhexene-1, 2,4-dimethylhexene-1, 2,5-dimethylhexene-1, 2-methyl-3-ethylpentene-1, 2,3,3-trimethylpentene-1, 2,3, 4-tri-methylpentene-1, 2-methyloctene-1, 2,6-dimethylheptene-1, 2,6-dimethyloctene-1, 2,3-dimethyldecene-1, 2-methylnonadecene-1, ethylene, propylene, butylene, amylene, hexylene, 1,3-butadiene, isoprene), halogenated monoolefinic or diolefinic hydrocarbons (e.g. alpha-chlorostyrene, alphabromostyrene, 2,5-dichlorostyrene, 2,5-dibromostyrene, 3,4-dichlorostyrene, o-, m- or p-fluorostyrene, 2,6-dichlrostyrene, 2,6-difluorostyrene, 3-fluoro-4-chlorostyrene, 3-chloro-4-fluorostyrene, 2,4,5-trichlorostyrene, dichloromonofluorostyrene, 2-chloropropene, 2-chlorobutene, 2chloropentene, 2-chlorohexene, 2-chloroheptene, 2-bromobutene, 2-bromoheptene, 2-fluorohexene, 2-fluorobutene, 2-iodopropene, 2-iodopentene, 4bromoheptene, 4-chloroheptene, 4-fluoroheptene, cis- or trans-1,2-dichloroethylene, 1,2-dibromoethylene, 1,2-difluoroethylene, 1,2diiodoethylene, chloroethylene (vinyl chloride), 1,1-dichloroethylene (vinylidene chloride), bromoethylene, fluoroethylene, iodoethylene, 1,1-dibromoethylene 1,1-difluoroethylene, 1,1-diiodoetylene, 1,1,2-trifluoroethylene, chlorobutadiene), organic or inorganic acid esters (e.g. vinyl acetate, vinyl propionate, vinyl butyrate, vinyl isobutyrate, vinyl valerate, vinyl caproate, vinyl enanthete, vinyl benzoate, vinyl toluate, vinyl p-chlorobenzoate, vinyl o-chlorobenzoate, vinyl p-methoxybenzoate, vinyl p-ethoxybenzoate, methyl methacrylate, ethyl methacrylate, propyl methacrylte, butyl methacrylate, amyl methacrylate, octyl methacrylate, decyl methacrylate, methyl crotonate, ethyl tiglate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, dodecyl acrylate, isopropenyl acetate, isopropenyl propionate, isopropenyl butyrate, isopropenyl isobutyrate, isopropenyl valerate, isopropenyl caproate, isopropenyl enanthete, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate, isopropenyl alpha-bromopropionate, vinyl alpha-chloroacetate, vinyl alpha-bromoacetate, vinyl alpha-chloropropionate, vinyl alpha-bromopropionate, vinyl alpha-chlorobutyrate, vinyl alpha-chlorovalerate, vinyl alpha-bromovalerate, allyl chloride, allyl cyanide, allyl bromide, allyl fluoride, allyl iodide, allyl chloride carbonate, allyl nitrate, allyl thiocyanate, allyl formate, allyl acetate, acetate propionate, allyl butyrate, allyl valerate, allyl caproate, allyl 3,5,5-trimethylhexanoate, allyl benzoate, allyl acrylate, ally crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, methallyl chloride, methallyl bromide, methallyl nitrate, methallyl thiocyanate, methallyl acetate, methallyl propionate, methallyl butyrate, methallyl valerate, methallyl benzoate, methallyl chloropropionate, beta-ethylallyl acetate, beta-propylallyl acetate, 4-acetoxy-1-butene, 4-acetoxy- 2-methylbutene, 4-acetoxy-2-(2,2-dimethylpropyl)-1-butene, 4-acetoxy-1pentene, methyl alpha-chloroacrylate, methyl alpha-bromoacrylate, methyl alpha-fluoroacrylate, methyl alpha-iodomethyl acrylate, ethyl alpha-chloroacrylate, propyl alpha-chloroacrylae, isopropyl alpha-chloroacrylate, isopropyl alpha-bromoacrylate, amyl alpha-chloroacrylate, decyl alpha-chloroacrylate, methyl alpha-cyanoacrylate, ethyl alpha-cyanoacrylate, amyl alpha-cyanoacrylate, decyl alpha-cyanoacrylate, dimethyl maleate, diethyl maleate, diallyl maleate, dimethyl fumarate, diethyl fumarate, dimethacryl fumarate, diethyl glutaconate), organic nitriles (e.g. acrylonitrile, methacrylonitrile, ethacrylonitrile, 3-octenenitrile, crotonitrile, oleonitrile), unsaturated alcohols (e.g. allyl alcohol, ethylene glycol monoacrylate, ethylene glycol monomethacrylate, propylene glycol monoacrylate, crotonalcohol, cinnamyl alcohol, o-hydroxystyrene), unsaturated amide (e.g. acrylamide, methacrylamide, crotonamide, cinnamylamide, p-benzamidostyrene), etc.

The amounts of the blocked acyl isocyanate compound (II) and the ethylenically unsaturated compound having an active hydrogen-containing group to be used may be respectively from about 1 to 99% by weight and from about 0.1 to 90% by weight on the basis of the total weight of the polymerizable compounds. The remainder may be the other polymerizable compound when used.

The polymerization may be carried out in an inert solvent in the presence of a polymerization initiator. As the polymerization initiator, there is normally employed a radical initiator such as azobisisobutyronitrile, benzoyl peroxide, cumene hydroperoxide, tetramethyl thiuram disulfide, 2,2-azobis(4-methoxy-2,4-dimethylvaleronitrile), acetylcyclohexylsulfonyl peroxide or 2,2'-azobis(2,4dimethylvaleronitrile). The amount of the polymerization initiator is usually from about 0.1 to 10% by weight based on the total weight of the compounds to be polymerized. As the inert solvent, there may be used the one chosen from those as exemplified with respect to the blocking of the acyl isocyanate compound (I) with the blocking agent (III). The use of the blocking agent (III) such as an alcohol itself together with or without the inert solvent as the reaction medium is especially preferred for prevention of the side reaction causing gelation. The polymerization temperature is ordinarily from about 20° to 200° C., preferably from about 80° to 150° C.

The polymerization reaction may be effected by adding the polymerization initiator to a mixture of the ccompounds to be polymerized and the inert solvent. In case of using the blocking agent (III) as the reaction medium, the acyl isocyanate compound (I) may be first introduced into a large amount of the blocking agent (III) to proceed the blocking reaction, and then the ethylenically unsaturated compound having an active hydrogen-containing group and optionally the other polymerizable compound, if used, with the inert solvent may be added to the reaction mixture to carry out the polymerization reaction. In effecting the polymerization, any other additives such as a polymerization regulator may be added thereto, if necessary.

The thus obtained polymer has usually a molecular weight of about 1,000 to 100,000, preferably of about 2,000 to 80,000. Such polymer is per se useful as a resin component in a coating agent, an adhesive agent or the like.

When the ethylenically usaturated compound having an active hydrogen-containing group used for production of the polymer is the one having an acidic or basic group, the water-dispersibility of such polymer is practically enhanced by neutralizing the acidic or basic group therein. For the purpose of introduction of an acidic or basic group into the molecule of a polymer, the ethylenically unsaturated compound is not necessarily required to have an active hydrogen-containing group; even if an active hydrogencontaining group is not present, an ethylenically unsaturated compound is still usable insofar as an acidic or basic group exists therein. Typical examples of such ethylenically unsaturated compound are 2-(dimethylamino)ethyl acrylate, 2-(dimethylamino)ethyl methacrylate, 2-(diethylamino)ethyl acrylate, 2-(diethylamino)ethyl methacrylate, 3-(diethylamino)propyl acrylate, 3-(diethylamino)propyl methacrylate, vinylpyridine, etc.

In case of the acidic group being present, the neutralization is carried out by treatment with a base. In case of the basic group being present, the neutralization is effected by treatment with an acid. The base or the acid as the neutralizing agent may be of low molecular weight or of high molecular weight. Examples of the base are organic amines (e.g. methylamine, ethylamine, methylethylamine, trimethylamine, dimethylaniline, pyridine, diethylethanolamine), inorganic bases (e.g. sodium hydroxide, potassium hydroxide), etc. Polyamines or the like are also usable. Examples of the acid are organic acids (e.g. lactic acid, acetic acid, propionic acid), inorganic acids (e.g. sulfuric acid, hydrochloric acid), etc. Polycarboxylic acids, organic sulfonic acids, organic phosphoric acids, etc. may be also usable. The neutralization is to be effected to such an extent that about 0.1 to 100%, preferably about 10 to nearly 100% of the acidic or basic group in the polymer is neutralized. When the neutralization extent is less than about 0.1%, sufficient water-dispersibility is not obtainable.

When the blocking agent (III) used for blocking the isocyanato group in the acyl isocyanate compound (I) contains an acidic or basic group, the resulting blocked acyl isocyanate compound (II) can have the corresponding acidic or basic group. In such case, the polymer produced by polymerization of the blocked acyl isocyanate compound (II) and the ethylenically unsaturated compound having an active hydrogen-containing group, optionally with the other polymerizable compound, can also have the corresponding acidic or basic group in the blocked isocyanatocarbonyl group. Neutralization of such acidic or basic group in the same manner as above is effective in enhancement of the water-dispersiblity of the polymer.

In order to obtain the dispersion, the reaction mixture comprising the neutralized polymer may be as such admixed with water. In an alternative, said reaction mixture may be subjected to removal of the liquid componnts therefrom by a per se conventional separation procedure, and the resulting neutralized polymer may be dispersed into water. In another alternative, the polymer before neutralization may be suspended in water, followed by neutralization. The content of the polymer in the dispersion is not limitative and may be usually from about 20 to 50% by weight.

The blocked isocyanatocarbonyl group in the polymer, irrespective of having an acidic or basic group or of being neutralized or not, is readily dissociated by heat, a catalyst or the like to form an isocyanatocarbonyl group which is highly reactive. It is notable that in comparison with a blocked isocyanato group, the blocked isocyanatocarbonyl group can be dissociated at a lower temperature. The isocyanatocarbonyl group as formed can serve as a crosslinking site for curing. The crosslinking may be effected by the use of a crosslinking agent. But, the use of a crosslinking agent is not essential, particularly when the polymer has such a group reactive to an isocyanatocarbonyl group as the one having an active hydrogen atom. As the result of crosslinking, there is usually formed an acylurethane or acylurea linkage having strong intermolecular cohesion force so that the resulting product is quite tough. Further, such linkage has a great capability of forming an intermolecular hydrogen bond, and therefore the resulting product is excellent in adhesive property.

In this invention, the polymer has a blocked isocyanatocarbonyl group and possesses various advantageous properties attributable to the characteristics of such blocked isocyanatocarbonyl group. When the polymer has an active hydrogen atom in the molecule, it is characteristic in being readily crosslinkable even in the absence of any crosslinking agent. When the polymer has an acidic or basic group in the molecule, it is provided with a good waterdispersibility by neutralization of the acidic or basic group. The resin composition obtained by dispersing such neutralized polymer into water can be readily cured, if necessary, in the presence of a crosslinking agent. The resultant crosslinked product is excellent in adhesion, clarity, heat resistance, etc. Accordingly, the resin composition of the invention is useful as a coating composition, an adhesive composition or the like. It is particularly useful as a water-based coating composition, an electrocoating composition, a sealing coating composition, a heat-resistant coating composition or the like for automobiles, plastics, etc.

Practical embodiments of this invention are illustratively shown in the following Examples. The terms Mn and Mw indicate respectively the number average molecular weight and the weight average molecular weight.

EXAMPLE 1 t-Butanol-blocked methacryloyl isocyanate (3.7 g), 2-hydroxyethyl methacrylate (2.6 g), styrene (2.0 g) and n-butyl acrylate (5.3 g) were dissolved in t-butanol (18 g) at 80° C. To the resulting solution, a solution of 2,2′-azobis(2,4-dimethylvaleronitrile) (0.41 g) in butyl acetate (5 g) was dropwise added, followed by aging for 2 hours to give a polymer having Mn=12,300 in a polymerization rate of 89%.

EXAMPLE 2 t-Butanol-blocked methacryloyl isocyanate (3.7 g), acrylamide (1.4 g) and n-butyl acrylate (7.9 g) were dissolved in dioxane (25 g) at 85° C. To the resulting solution, a solution of 2,2′-azobis(2,4-dimethylvaleronitrile) (0.39 g) in dioxane (5 g) was dropwise added, followed by aging for 2 hours to give a polymer having Mn=8,600 in a polymerization rate of 91%.

EXAMPLES 3 to 11

In the same manner as in Example 1 or 2, the polymers as shown in Table 1 were produced. The reaction conditions, the polymerization rates and the molecular weights of the produced polymers are also shown in Table 1, wherein the following abbreviations are used: 2-HEMA: 2-hydroethyl methacrylate; 2-HEA: 2-hydroxyethyl acrylate; ST: styrene; MMA: methyl methacrylate; NBA: n-butyl acrylate; ABDV: 2,2′-azobis(2,4-dimethylvaleronitrile).

TABLE 1

| Example No. | Blocking agent | Ethylenically unsaturated monomer having active hydrogen-containing group | Amount (g) | BMAI*1 (g) | ST (g) | MMA (g) | NBA (g) | Solvent (g) | Temp. (°C.) | Polymerization initiator (ABDV) (%) | Polymerization rate (%) | Molecular weight (Mn) |
|---|---|---|---|---|---|---|---|---|---|---|---|---|
| 3 | 2-Ethyl hexanol | 2-HEMA | 3.9 | 7.2 | 0 | 0 | 12.9 | 2-Ethyl hexanol (18) Butyl acetate (18) | 110 | 3 | 80 | 7,100 |
| 4 | t-Butanol | Acrylamide | 1.4 | 3.7 | 0 | 0 | 7.9 | Dioxane (8) t-Butanol (18) | 79 | 3 | 86.0 | 7,700 |
| 5 | t-Butanol | Methacrylic acid | 2.3 | 5.0 | 0 | 0 | 7.8 | Butyl acetate (20) t-Butanol (18) | 90 | 3 | 66.0 | 7,200 |
| 6 | t-Butanol | Methacrylic acid | 2.3 | 5.0 | 0 | 0 | 7.8 | Butyl acetate (13) Dioxane (25) | 100 | 3 | 92.0 | 5,500 |
| 7 | t-Butanol | Phosmar M*2 | 1.5 | 1.5 | 0 | 6.0 | 6.0 | Butyl acetate (30) Dioxane (5) Toluene (15) | 100 | 3 | 88.5 | 7,000 |
| 8 | t-Butanol | TBAS*3 | 1.5 | 2.25 | 0 | 5.0 | 6.25 | t-Butanol (35) Butyl acetate (10) Toluene (15) | 120 | 3 | 80.0 | 1,800 |
| 9 | t-Butanol | 2-HEMA | 1.43 | 2.04 | 2 | 2.83 | 5.3 | Butyl acetate (7.2) t-Butanol (18) | 90 | 3 | 88.5 | 12,000 |
| 10 | t-Butanol | 2-HEA | 1.6 | 2.6 | 1.4 | 0 | 4.4 | Butyl acetate (5) t-Butanol (18) | 80 | 3 | 92 | 11,200 |
| 11 | t-Butanol | TBAEMA*4 | 3.0 | 3.0 | 0 | 4.5 | 4.5 | Butyl acetate (10) t-Butanol (35) | 85 | 3 | 70 | 4,400 |

Note:
*1 Blocked methacryloyl isocyanate

*2 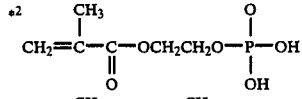

*3 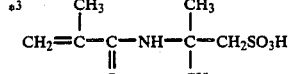

*4 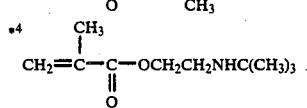

EXAMPLE 12

To a mixture of pyrrolidone (5.3 g), butyl acetate (5.0 g) and n-butyl acrylate (5.0 g), methacryloyl isocyanate (1.7 g) was dropwise added, and the resultant mixture was stirred at a temperature lower than 80° C. until the absorption of NCO in the IR spectrum disappeared. Methyl methacrylate (5.0 g), 2-hydroxyethyl methacrylate (2.0 g) and pyrrolidone (21 g) were added thereto. To the resulting mixture, a solution of 2,2'-azobis(2,4-dimethylvaleronitrile) (450 mg) in butyl acetate (15 g) was dropwise added in 1 hour, followed by aging for 2 hours to give a polymer having Mn=10,000 in a polymerization rate of 87%.

EXAMPLE 13 t-Butanol-blocked methacryloyl isocyanate (5 g), methacrylic acid (2.3 g), n-butyl acrylate (7.8 g) and styrene (1.5 g) were dissolved in dioxane (25 g) at 100° C. To the resulting mixture, a solution of 2,2'-azobis(2,4-dimethylvaleronitrile) (3.5%; 580 mg) in butyl acetate (10 g) was dropwise added, followed by aging for 2 hours to give a polymer having Mn=5,500 and Mw=12,700 in a polymerization rate of 87.6%. The reaction mixture (51.6 g) containing the polymer (14.5 g) was added to water (20 g), and then triethylamine (3.0 g) was added thereto at room temperature to give an aqueous dispersion of the neutralized polymer, which is quite stable at room temperature.

EXAMPLE 14

N,N-Dimethylaminoethyl methacrylate (3 g), t-butanol-blocked methacryloyl isocyanate (3 g), methyl methacrylate (4.5 g) and n-butyl acrylate (5.5 g) were dissolved in butyl acetate (25 g) at about 90° C. A solution of 2,2'-azobis(2,4-dimethylvaleronitrile) (480 mg) in butyl acetate (10 g) was dropwise added thereto in about 1 hour, followed by aging for 2 hours to give a polymer having Mn=4,600 in a polymerization rate of 85%. After removal of the liquid components from the reaction mixture by distillation under reduced pressure, the polymer (13.6 g) was neutralized with acetic acid (1.8 g) and admixed with water to give an aqueous dispersion of the neutralized polymer, which is quite stable at room temperature.

EXAMPLE 15

N,N-Dimethylaminoethanol-blocked methacryloyl isocyanate (12.5 g), ethyl acrylate (12.5 g), methyl methacrylate (5.0 g), styrene (5.0 g) and ethylhexyl acrylate (15.0 g) were dissolved in butyl acetate (55 g) at about 100° C. A solution of 2,2'-azobisisobutyronitrile (3%) (1.5 g) in butyl acetate (20 g) was dropwise added thereto in about 1 hour, followed by aging for 3 hours to give a polymer having Mn=8,700 in a polymerization rate of 85%. After addition of water thereto, neutralization was carried out with a polycarboxylic acid having a hydroxyl group (comprising units of methyl methacrylate, ethyl acrylate, acrylic acid, hydroxyethyl methacrylate in a weight proportion of 29.8/41.3/10.3/18.6; hydroxyl value, 80; acid value, 80) to give an aqueous dispersion, which is quite stable at room temperature.

EXAMPLES 16 to 31

In the same manner as in Example 13 or 14, the polymers and the aqueous dispersions of the neutralized polymers as shown in Table 2 were produced. The reaction conditions, the polymerization rates, the molecular weights of the polymers produced and the water dispersibility of the neutralized polymers are also shown in Table 1, wherein the following abbreviations are used: 2-HEMA: 2-hydroethyl methacrylate; 2-HEA: 2-hydroxyethyl acrylate; ST: styrene; MMA: methyl methacrylate; NBA: n-butyl acrylate; EA: ethyl acrylate; EHA: ethylhexyl acrylate; ABDV: 2,2'-azobis(2,4-dimethylvaleronitrile); AIBN: 2,2'-azobisisobutyronitrile.

In the water-dispersibility at room temperature, 0 indicates a good result.

TABLE 2

| Example No. | Blocking agent | Ethylenically unsaturated monomer having active hydrogen-containing group (Amount (g)) | BMAI*1 (g) | ST (g) | MMA (g) | NBA (g) | EA (g) | EHA (g) | Solvent (Amount (g)) | Temp. (°C.) | Polymerization initiator (%) | Polymerization rate (%) | Molecular weight (Mn) | Neutralizing agent | Dispersibility in water at room temperature |
|---|---|---|---|---|---|---|---|---|---|---|---|---|---|---|---|
| 16 | t-Butanol | Methacrylic acid (43.6) | 113.9 | 100.0 | 67.9 | 0 | 63.0 | 154.0 | Butyl acetate (542) | 120 | AIBN (2) | 78.6 | 8,000 | Triethyl-amine | o |
| 17 | t-Butanol | Acrylic acid (2.31) | 6.93 | 7.5 | 7.5 | 0 | 3.0 | 3.0 | Butyl acetate (45.0) | 90 | ABDV (3) | 88.2 | 7,000 | Dimethyl-ethanol-amine | o |
| 18 | t-Butanol | Methacrylic acid (8.72) | 22.75 | 20.0 | 13.57 | 0 | 12.60 | 30.83 | Butyl acetate (100) Toluene (32.47) | 95~83 | ABDV (4) | 87.3 | 9,000 | Dimethyl-ethanol-amine | o |
| 19 | n-Butanol | Methacrylic acid (6.4) | 115.5 | 125.5 | 157.0 | 0 | 50.0 | 50.0 | Butyl acetate (250) Dioxane (250) | 120 | ABDV (4) | 80.0 | 7,000 | Pyridine | o |
| 20 | n-Butanol | Acrylic acid (6.39) | 6.93 | 7.5 | 9.19 | 0 | 3.0 | 3.0 | Butyl acetate (45.0) | 100 | AIBN (3) | 99.0 | 6,600 | Dimethyl-ethanol-amine | o |
| 21 | Methanol | Acrylic acid (47.5) | 2.5 | 0 | 0 | 0 | 0 | 0 | Dioxane (200) | 100 | AIBN (4) | 80.0 | 9,000 | Dimethyl-ethanol-amine | o |
| 22 | 2-Methoxy-ethanol | Methacrylic acid (8.72) | 22.75 | 20.0 | 13.57 | 0 | 12.60 | 30.83 | Butyl acetate (59) Dioxane (50) | 120~125 | AIBN (4) | 90.5 | 8,800 | Dimethyl-ethanol-amine | o |
| 23 | Butoxy-ethoxy-ethanol | Methacrylic acid (8.72) | 33.61 | 20.0 | 13.57 | 0 | 12.60 | 30.83 | Butyl acetate (80) t-Butanol (80) | 120 | AIBN (4) | 95.5 | 8,500 | Dimethyl-ethanol-amine | o |
| 24 | Dimethyl-amino-ethanol | Methacrylic acid (8.72) | 22.75 | 20.0 | 13.57 | 0 | 12.60 | 30.83 | Butyl acetate (100) Dioxane (68.5) | 87~83 | AIBN (4) | 90.5 | 9,800 | Dimethyl-ethanol-amine | o |
| 25 | t-Butanol | Methacrylic acid (2.30) | 5.0 | 0 | 0 | 7.8 | 0 | 0 | Butyl acetate (20) t-Butanol (18) | 90 | ABDV (3) | 66.0 | 7,200 | Triethyl-amine | o |
| 26 | t-Butanol | Phosmar M*2 (1.5) | 1.5 | 0 | 6.0 | 6.0 | 0 | 0 | Butyl acetate (30) Dioxane (5) Toluene (15) | 100 | ABDV (3) | 88.5 | 7,000 | Dimethyl-ethanol-amine | o |
| 27 | t-Butanol | TRAS*3 (1.5) | 2.25 | 0 | 5.0 | 6.25 | 0 | 0 | t-Butanol (35) Butyl acetate (10) Toluene (15) | 120 | ABDV (3) | 80.0 | 1,800 | Dimethyl-ethanol-amine | o |
| 28 | t-Butanol | TBAEMA*4 (3.0) | 3.0 | 0 | 4.5 | 4.5 | 0 | 0 | Butyl acetate (10) t-Butanol (35) | 85 | ABDV (3) | 70.0 | 4,400 | Acetic acid | o |
| 29 | t-Butanol | TBAEMA (2.0) | 2.0 | 0 | 4.0 | 4.0 | 0 | 0 | Butyl acetate (36) | 90 | ABDV (3) AIBN (0.3) | 78.0 | 5,500 | Acetic acid | o |
| 30 | t-Butanol | N,N—Diethyl-aminoethyl methacrylate (3.0) | 3.0 | 0 | 4.5 | 4.5 | 0 | 0 | Butyl acetate (35) | 95~100 | ABDV (3) | 85.0 | 5,800 | Acetic acid | o |
| 31 | t-Butanol | N,N—Diethyl-aminoethyl methacrylate (1.5) 2-HEMA (2.3) | 2.3 | 0 | 5.0 | 4.0 | 0 | 0 | t-Butanol (35) | 85 | ABDV (3) | 85.0 | 7,500 | Acetic acid | o |

Note: Same as in Table 1.

What is claimed is:

1. A blocked isocyanatocarbonyl group-containing polymer which comprises a carbon-carbon backbone chain and at least one blocked isocyanatocarbonyl group and at least one active hydrogen-containing group and has a number average molecular weight of 1,000 to 100,000, the contents of said blocked isocyanatocarbohyl group and said active hydrogen-containing group being respectively from 1 to 99% by weight and from 0.1 to 90% by weight on the weight of the polymer.

2. The polymer according to claim 1, which is the one obtained by polymerizing a blocked acyl isocyanate compound of the formula:

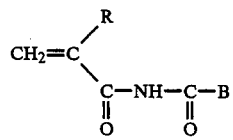
(II)

wherein R is a hydrogen atom or a lower alkyl group and B is a blocking agent for an isocyanato group and an ethylenically unsaturated compound having at least one active hydrogen-containing group, optionally with at least one other polymerizable compound.

3. The polymer according to claim 2, wherein the active hydrogen-containing group is an acidic or basic group is a carboxylic acid group, a sulfonic acid group, a phosphoric acid group or an amino group.

4. A blocked isocyanatocarbonyl group-containing polymer which comprises a carbon-carbon backbone chain and at least one blocked isocyanatocarbonyl group and at least one acidic or basic group and has a number average molecular weight of 1,000 to 100,000, the contents of said blocked isocyanatocarbonyl group and said acidic or basic group being respectively from 1 to 99% by weight and from 1 to 90% by weight on the weight of the polymer.

5. The polymer according to claim 4, which is the one obtained by polymerizing a blocked acyl isocyanate compound of the formula:

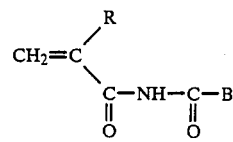
(II)

wherein R is a hydrogen atom or a lower alkyl group and B is a blocking agent for an isocyanato group and an ethylenically unsaturated compound having at least one acidic or basic group, optionally with at least one other polymerizable compound.

6. The polymer according to claim 5, wherein the acidic or basic group is a carboxylic acid group, a sulfonic acid group, a phosphoric acid group or an amino group.

7. The polymer according to claim 4, wherein 0.1 to 100% of said acidic or basic group is neutralized.

8. A water-dispersible resin composition which comprises a blocked isocyanatocarbonyl group-containing polymer comprising a carbon-carbon backbone chain and at least one blocked isocyanatocarbonyl group and at least one acidic or basic group and having a number average molecular weight of 1,000 to 100,000, the contents of said blocked isocyanatocarbonyl group and said acidic or basic group being respectively from 1 to 99% by weight and from 1 to 90% by weight on the weight of the polymer and 0.1 to 100% of said acidic or basic group being neutralized.

9. The composition according to claim 8, wherein the blocked isocyanatocarbonyl group-containing polymer is the one obtained by polymerizing a blocked acryl isocyanate compound of the formula:

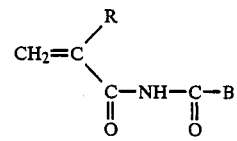
(II)

wherein R is a hydrogen atom or a lower alkyl group and B is a residue of a blocking agent excluding a hydrogen atom therefrom and an ethylenically unsaturated compound having at least one acidic or basic group, optionally with at least one other polymerizable compound.

10. The composition according to claim 9, wherein the acidic or basic group is a carboxlic group, a sulfonic group, a phosphoric group or an amino group.

* * * * *